United States Patent [19]

Ozaki et al.

[11] 4,140,499

[45] Feb. 20, 1979

[54] GAS MIXTURE-SEPARATING DEVICE

[75] Inventors: Osamu Ozaki, Yokohama; Tetsuo Morisue, Kawasaki; Masayoshi Ohno, Yokohama, all of Japan

[73] Assignee: Tokyo Shibaura Electric Co., Ltd., Kawasaki, Japan

[21] Appl. No.: 746,533

[22] Filed: Dec. 1, 1976

[30] Foreign Application Priority Data

Dec. 2, 1975 [JP] Japan .................. 50-142383

[51] Int. Cl.² ............................................ B01D 53/22
[52] U.S. Cl. ................................... 55/158; 55/16
[58] Field of Search .................. 55/16, 158; 210/23 H, 210/23 F, 195 R, 321 R, 433 M

[56] References Cited

U.S. PATENT DOCUMENTS

| 2,540,152 | 2/1951 | Weller ........................................ 55/16 |
| 2,966,235 | 12/1960 | Kammermeyer ........................ 55/16 |
| 3,208,197 | 9/1965 | Simon et al. ............................. 55/16 |
| 3,246,449 | 4/1966 | Stern et al. ............................... 55/16 |
| 3,250,080 | 5/1966 | Garwin .................................. 55/16 X |
| 3,856,569 | 12/1974 | Strong ................................... 210/23 F |
| 3,961,917 | 6/1976 | Benedict et al. .......................... 55/16 |

*Primary Examiner*—Robert H. Spitzer
*Attorney, Agent, or Firm*—Oblon, Fisher, Spivak, McClelland & Maier

[57] ABSTRACT

A gas mixture-separating device which comprises a first separation cell provided with a first membrane; a second separation cell provided with a second membrane; a feed pipe for conducting a gas mixture being separated to the high pressure chambers of the first and second separation cells; a first discharge pipe for drawing off from the first separation cell either of the gas portions which have permeated the first membrane and that which has not permeated said first membrane; a first feedback pipe for returning the other gas portion to said feed pipe, a second discharge pipe for drawing off from the second separation cell either of the gas portions which have permeated the second membrane and that which has not permeated said second membrane; and a second feedback pipe for returning the other gas portion to said feed pipe.

7 Claims, 4 Drawing Figures

GAS MIXTURE-SEPARATING DEVICE

BACKGROUND OF THE INVENTION

This invention relates to a gas mixture-separating device provided with a membrane and more particularly to a gas mixture-separating device comprising two separation cells, one being an enrichment separation cell provided with a membrane, and the other being a dilution separation cell similarly provided with a membrane.

The known separation cell used with a gas mixture-separating device includes the type containing one or two kinds of membrane. The membrane is made of, for example, silicone rubber, palladium, polytetrafluoroethylene or cellulose acetate.

The prior art separation cell system in which each cell was provided with one or two kinds of membrane still had a small separation factor per unit separation cell. Therefore, the conventional separation cell system had the drawback that to attain high enrichment or high dilution, a considerable number of separation cells had to be assembled in the cascade form. Consequently, demand has been made for development of a gas mixture-separating device in which each separation cell has a large separation factor.

SUMMARY OF THE INVENTION

It is accordingly the object of this invention to provide a gas mixture-separating device comprising two separation cells, in which separation of a gas mixture by means of membranes is carried out by most effectively utilizing the original gas-separating performance of a membrane itself (expressed in a separation factor or permeability) and an increased gas-separating performance resulting from gas flow patterns in an enrichment separation cell mainly undertaking enrichment and a dilution separation cell mainly carrying out dilution.

According to an aspect of this invention, there is provided a gas mixture-separating device which comprises a first separation cell provided with a first membrane; a second separation cell provided with a second membrane; a feed pipe for conducting a gas mixture being separated to the high pressure chambers of the first and second separation cells; a first discharge pipe for drawing off from the first separation cell either of the gas portions which have permeated the first membrane and that which has not permeated said first membrane; a first feedback pipe for returning the other gas portion to said feed pipe; a second discharge pipe for drawing off from the second separation cell either of the gas portions which have permeated the second membrane and that which has not permeated said second membrane; and a second feedback pipe for returning the other gas portion to said feed pipe.

DETAILED DESCRIPTION OF THE INVENTION

With the gas mixture-separating device of this invention, separated component gases are drawn off from the first and second separation cells either in the enriched or in the diluted form. Various types of gas mixture-separating devices may be contemplated according as a component gas is drawn off from the high pressure chamber of the respective separation cells in the form which has not permeated the membrane or from the low pressure chamber thereof in the form which has permeated the membrane. Namely, the following three types may be conceivable.

Figure 3:
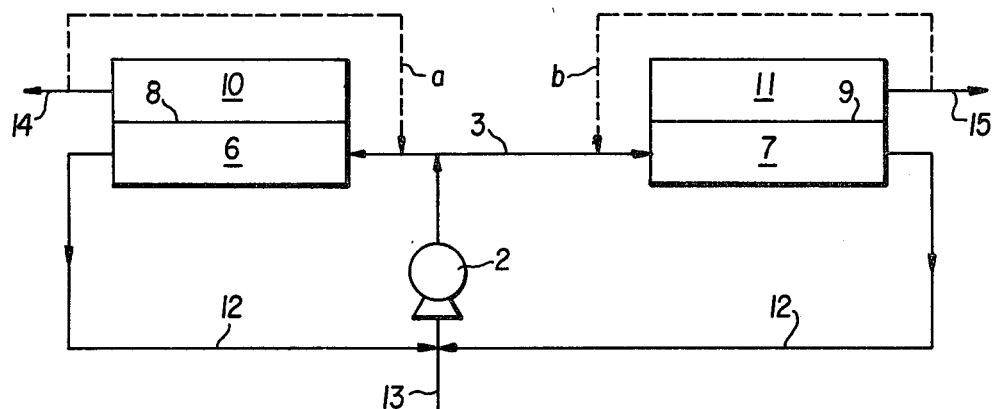
FIG. 3 is a flow sheet of a second embodiment of a gas mixture-separating device embodying this invention.
Figure 4:
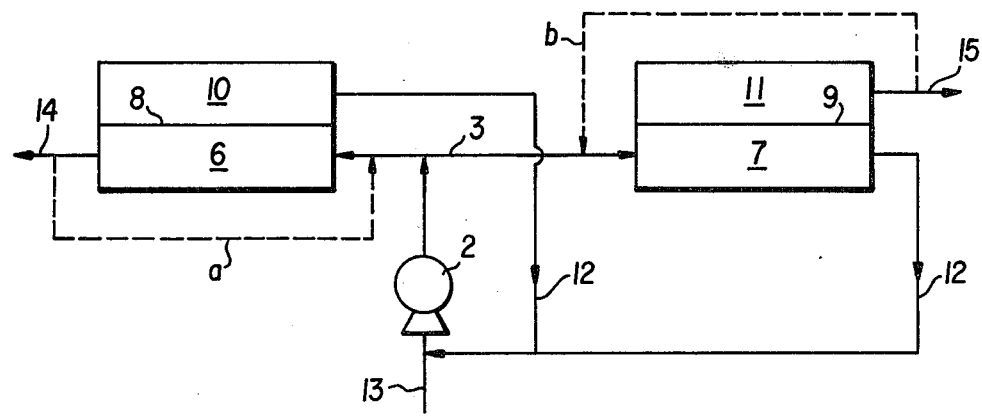
FIG. 4 is a flow sheet of a third embodiment of a gas-mixture-separating device embodying this invention.

(1) a gas mixture-separating device in which component gases are drawn off from the high pressure chamber of both first and second separation cells;

(2) a gas mixture-separating device in which component gases are drawn off from the low pressure chamber of both first and second separation cells, as shown in FIG. 3; and (3) a gas mixture-separating device in which a component gas is drawn off from the high pressure chamber of the first separation cell and from the low pressure chamber of the second separation cell, as shown in FIG. 4, or vice versa.

With the above-mentioned types (1) and (2), the first membrane of the first separation cell displays the opposite gas-separating tendency to the second membrane of the second separation cell. With the type (3), the first membrane of the first separation cell and the second membrane of the second separation cell have the same gas-separating tendency.

There will now be described by reference to the appended drawings the representative type (1) of gas mixture-separating embodying this invention.

Figures 1, 2:
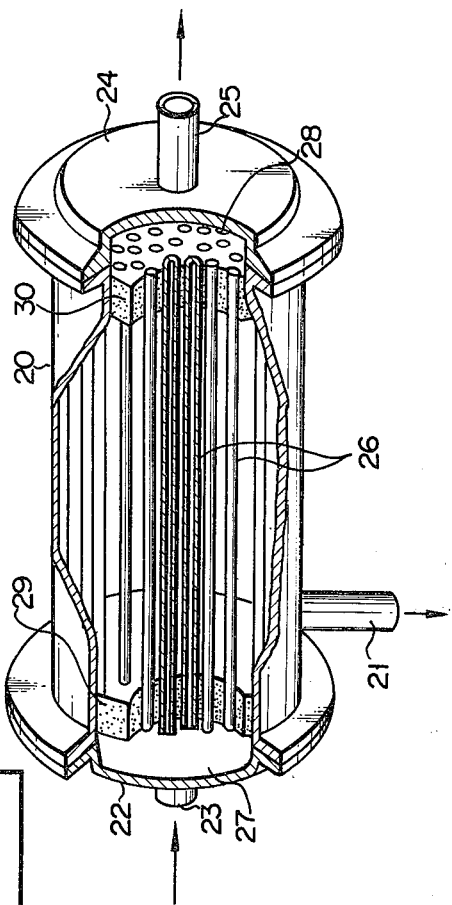
FIG. 1 is a flow sheet of a gas mixture-separating device embodying this invention.
FIG. 2 is an oblique view, partly in section, of a separation cell used with the gas mixture-separating device of the invention.

A gas mixture-separating device embodying this invention which is schematically illustrated in FIG. 1 comprises an enrichment separation cell and a dilution separation cell provided with membranes having opposite gas-separating tendencies.

A gas mixture being separated which is supplied from a gas mixture source 1 has its pressure raised to a prescribed level by a pump 2 and is divided into two directions in a branched pipe 3. The divided gas portions enter a high pressure chamber 6 of a first separation cell 4 and a high pressure chamber 7 of a second separation cell 5 respectively. Part of the gas portions received in the high pressure chambers permeate the first membrane 8 and second membrane 9, pass through low pressure chambers 10, 11, and are finally brought back to a feed pipe 13 through a feedback pipe 12. The gas portions which have not permeated the first membrane 8 and second membrane 9 pass through discharge pipes 14, 15 and pressure-reducing valves 16, 17 into a diluted gas receptacle 18 and enriched gas receptacle 19. Thus components of a gas mixture supplied from the source 1 are separated in the enriched and diluted forms. The foregoing description refers to the case where the first membrane 8 is the type which causes the desired component of a gas mixture being treated to be enriched by permeation; and the second membrane 9 is the type which causes the desired component to be diluted by permeation. In this case, the first separation cell 4 is a dilution type and the second separation cell 5 is an enrichment type. Where the first and second membranes 8, 9 are replaced by each other, obviously the first separation cell 4 is an enrichment type and the second separation cell 5 is a dilution type.

There will now be given numerical data relative to the parts of the subject gas mixture-separating device of FIG. 1 when separation of a gas mixture is carried out.

Referring to the flow sheet of FIG. 1, let it be assumed that Z represents the concentration of an original gas mixture being separated; F shows a flow rate of said gas mixture; and Z* indicates the concentration of a gas blend consisting of the original gas mixture being treated and gas portions which have returned to the feed pipe after permeating the first and second membranes of the first and second separation cells. Further, let it be assumed that $L_1$ denotes a flow rate of a gas supplied to the first separation cell 4; $L_2$ shows a flow rate of a gas supplied to the second separation cell 5; $\theta_1$ indicates the cut for the first separation cell 4 (said cut is expressed in the ratio of a flow rate of a gas which has permeated the membrane to a flow rate of a gas supplied to the separation cell); and $\theta_2$ represents said cut for the second separation cell 5. Further, the enrichment separation factor of the respective separation cells (the ratio of the outlet concentration of a gas enriched in the separation cell to the concentration of a gas supplied to the separation cell) and the dilution separation factor of the respective separation cells (the ratio of the outlet concentration of a gas diluted in the separation cell to the concentration of a gas supplied to the separation cell) are respectively designated as $g_1$, $h_1$ for the first separation cell 4 and $g_2$, $h_2$ for the second separation cell 5. Then the concentration of a gas which has permeated the membrane of the first separation cell 4 is expressed as $Z^* g_1$; the flow rate of said gas is expressed as $L_1\theta_1$; the concentration of a gas which has not permeated the membrane of the first separation cell is denoted as $Z^* h_1$; the flow rate of said gas is indicated as $L_1(1-\theta_1)$; the concentration of a gas which has permeated the membrane of the second separation cell 5 is expressed as $Z^* h_2$; the flow rate of said gas is indicated as $L_2\theta_2$; the concentration of a gas which has not permeated the membrane of the second separation cell 5 is shown as $Z^* g_2$; the flow rate of said gas is denoted as $L_2(1-\theta_2)$. Further, $\alpha_1(=g_1/h_1)$ is taken to denote the separation factor of the first separation cell 4; $\alpha_2(=g_2/h_2)$ is taken to represent the separation factor of the second separation cell 5; and $\alpha_{st}(=g_2/h_1)$ is taken to show the separation factor of the entire gas mixture-separating device. Where $\theta_1$ and $\theta_2$ are chosen to have such values as give $g_2 > g_1$ and $h_2 > h_1$, then there result $\alpha_{st} > \alpha_1$ and $\alpha_{st} > \alpha_2$. Therefore, the gas mixture-separating device of this invention which comprises an enrichment separation cell and a dilution separation cell has a larger separation factor than the conventional gas separation.

The enrichment separation factor G of the entire gas mixture-separating device of this invention (the ratio of the concentration of a gas enriched by said device to the concentration of an original gas mixture supplied to said device) and the dilution separation factor H (the ratio of the concentration of a gas diluted by said device to the concentration of an original gas mixture supplied to said device) may be expressed by the following equations respectively:

$$G = \frac{Z^* g_2}{Z} = \frac{L_1(1-\theta_1) + L_2(1-\theta_2)}{L_1(1-\theta_1)h_1 + L_2(1-\theta_2)g_2} \cdot g_2$$

$$H = \frac{Z^* h_1}{Z} = \frac{L_1(1-\theta_1) + L_2(1-\theta_2)}{L_1(1-\theta_2)h_1 + L_2(1-\theta_2)g_2} \cdot h_1$$

With the gas mixture-separating device of this invention, therefore, the desired rate of enrichment and dilution can be freely determined with $\theta_1$ and $\theta_2$ given by the following equations:

$$\theta_1 < 1 - \frac{L_2}{L_1}\sqrt{\frac{g_2}{h_2}}(1-\theta_2) \quad \text{(i)}$$

when enrichment is carried out at a larger rate than dilution $$\theta_1 > 1 - \frac{L_2}{L_1}\sqrt{\frac{g_2}{h_1}}(1-\theta_2) \quad \text{(ii)}$$

when dilution is carried out at a larger rate than enrichment $$\theta_1 = 1 - \frac{L_2}{L_1}\sqrt{\frac{g_2}{h_1}}(1-\theta_2) \quad \text{(iii)}$$

when enrichment and dilution are carried out at the same rate.

There will now be described by reference to FIG. 2 the concrete arrangement and operation of two separation cells 4, 5 used with the gas mixture-separating device of this invention. (Since both separation cells are of substantially the same type, reference is only made to one of them.) The separation cell comprises a body 20; a cap 22 fitted with a feed pipe 23; a cap 24 fitted with a discharge pipe 25; and isolations plates 29, 30 supporting both ends of a large number of tubular membranes. Void spaces 27, 28 formed between the caps 22, 24 and the corresponding isolation plates 29, 30 are separated from a void space provided immediately inside of the cell body 20 by means of the tubular membranes 26. A gas mixture brought into the separation cell through the feed pipe 23 passes through the void space 27 into the tubular membranes 26. While the gas mixture is flowing along the inner walls of the tubular membranes 26, part of said gas mixture permeates said tubular membranes 26, runs into the void space provided immediately inside of the cell body 20, and is drawn off through a discharge pipe 21. That portion of the gas mixture which has not permeated the tubular membranes 26 enters the void space 28 and flows out through a discharge pipe 25. For the object of this invention, it is possible to use a combination of two separation cells of substantially the same arrangement (except for the tubular membranes) or to receive said two separation cells in one vessel.

The gas mixture-separating device of this invention may be of the multistage type comprising a large number of separation cells assembled in the cascade form. (In this case, each stage is formed of two separation cells.) Where, in such gas mixture-separating device, proper selection is made of the kind and area of the tubular membranes used with the first and second separation cells and also of the extent of cuts $\theta_1$, $\theta_2$ carried out by said first and second separation cells, then said gas mixture-separating device has been found to have a larger separation factor than the conventional gas mixture-separating device.

This invention will be more fully understood by reference to the following example in which a gas mixture was separated by the device of this invention.

EXAMPLE

The tubular membrane of the first separation cell was formed of a tubular silicone rubber membrane 1.0 mm in outer diameter and 0.3 mm in inner diameter. The tubular membrane of the second separation cell was prepared from a tubular cellulose acetate membrane 0.8 mm in outer diameter and 0.5 mm in inner diameter. A gas mixture consisting of helium and krypton (100 ppm) was separated into the components by means of a separating device provided with the above-mentioned first and second separation cells. In this case, the tubular membrane of the first separation cell had an area of 88 $m^2$, and that of the second separation cell had an area of 0.03 $m^2$. The extent of the cut $\theta_1$ was set at 0.7 and that of the cut $\theta_2$ at 0.9. The high pressure and low pressure chambers of both first and second separation cells were chosen to have pressures of 10 kg/cm$^2$ G and 0 kg/cm$^2$ G respectively. Where an original gas mixture had a flow rate of 1.0 N m$^3$/hr, gas portions running through the various sections of the subject separating device had such concentrations and flow rates as are given in FIG. 1. The separation factor of the separating device was about 67.

Where the tubular silicone rubber membrane and a tubular cellulose acetate membrane were used alone under the same conditions as described above, each separation cell had separation factors of about 16 and about 13 respectively. Therefore, the gas mixture-separating device of this invention which uses a smaller number of cascade stages, pumps, control units and instruments is very advantageous from the standpoint of cost and maintenance.

The foregoing description refers to the case where a mixture of krypton and helium was separated into the components. However the gas mixture-separating device of this invention is not limitted to this case, but is applicable to separation of any gas mixture. Namely, the present separating device is available for separation of a desired component from a gas mixture consisting of two or more of $H_2$, He, $N_2$, $O_2$, air, Ne, Ar, Kr, Xe, Rn, $F_2$, $Cl_2$, $Br_2$, $I_2$, $UF_6$, $O_3$, $H_3$, $C_mH_n$ (hydrocarbon gases), $SO_2$, $C_2H_3Cl$ (vinyl chloride monomer), $C_2H_3CN$ (acrylonitrile), $NO_x$ (nitrogen oxides), and isotopes of said gases. The material of a tubular membrane used with the subject separating device includes not only silicone rubbers, cellulose acetate, but also, for example, polyethylene, tetramethylpentane, polybutadiene, ethyl cellulose, Nuclear Pore (trademark of a product manufactured by the General Electric Company of the United States), polytetrafluoroethylene, polyester, and porous metal membrane. Further, referring to the form in which a gas runs through the respective separation cells, the gas was chosen to make a countercurrent flow in both first and second separation cells in the case of FIG. 1. However, the gas may run in any of a countercurrent flow, concurrent flow, cross flow and complete mixed stream. The extent of the cuts $\theta_1$, $\theta_2$ can also be determined by controlling any of, for example, a pressure-reducing valve, pressure control valve, flow control valve and pressurizing device. The membrane may be fabricated in the form of a tube, flat plate, spiral wound plate, hollow fiber, or said hollow fiber or said tube containing a porous core formed of granular or wire material.

With the gas mixture-separating device of FIG. 1, it is further possible to provide the respective separation cells with a recycle pipe for returning that portion of a gas which has not permeated the tubular membranes of said separation cells to the feed pipe thereof. In FIG. 1, said recycle pipes a, b are indicated in a dotted line. In some cases, however, it is necessary to provide a pump in said recycle pipes a, b.

The foregoing description refers to a gas mixture-separating device embodying this invention (FIG. 1) in which the membrane of the first separation cell and that of the second separation cell had opposite gas-separating tendencies; and enriched and diluted gases are drawn off from the high pressure chamber of both first and second separation cells in the form which have not permeated the membrane thereof. As previously mentioned, however, other modifications of the gas mixture-separating device of this invention may be contemplated as follows:

A. A gas mixture-separating device in which the membrane of the first separation cell and that of the second separation cell have opposite gas-separating tendencies; a gas portion which has permeated the membranes of the first and second separation cells is drawn off in the diluted or enriched form; and a gas portion which has not permeated the membranes of the first and second separation cells is returned to the gas-feeding side of said device.

B. A gas mixture-separating device in which the membranes of both first and second separation cells have the same gas-separating tendencies; a gas portion which has permeated the membrane of the first separation cell is returned to the gas-feeding side of said separation device; a gas portion which has not permeated the membrane of the first separation cell is drawn off in the enriched or diluted form; a gas portion which has permeated the membrane of the second separation cell is drawn off in the diluted or enriched form; and a gas portion which has not permeated the membrane of the second separation cell is returned to gas-feeding side of said device.

With the above-mentioned modifications A and B, it is possible further to provide the respective separating device with the following recycle pipes.

(a) Modification A of the separating device including a recycle pipe for returning that portion of a gas which has permeated the tubular membrane of the first separation cell to the feed pipe thereof and/or a recycle pipe for returning that portion of a gas which has permeated the tubular membrane of the second separation cell to the feed pipe thereof.

(b) Modification B of the separating device including a recycle pipe for returning that portion of a gas which has not permeated the tubular membrane of the first separation cell to the feed pipe thereof and/or a recycle pipe for returning that portion of a gas which has permeated the tubular membrane of the second separation cell to the feed pipe thereof.

What we claim is:

1. A gas mixture-separating device which comprises a first separation cell provided with a first membrane; a second separation cell provided with a second membrane; a feed pipe interconnecting said first and second separation cell into a single set of separation cells for conducting a gas mixture being separated to high pressure chambers of the first and second separation cells; a first discharge pipe through which the gas portion which has not permeated the first membrane is conducted from the first separation cell; a first feedback pipe for returning the gas portion which has permeated the first membrane of the first separation cell from a low pressure chamber thereof to the feed pipe; a second discharge pipe through which the gas portion which has not permeated the second membrane of the second separation cell is conducted from the high pressure chamber of the second separation cell; and a second feedback pipe for returning the gas which has permeated the second membrane of the second separation cell from a low pressure chamber of the second separation cell to the feed pipe, the membrane of the first separation cell and that of the second separation cell having the opposite gas-separating tendencies.

2. The gas-separating device according to claim 1 which further comprises a recycle pipe extending from the first discharge pipe to a branch of the feed pipe which is connected to the first separation cell.

3. The gas-separating device according to claim 1 which further comprises a recylce pipe extending from the second discharge pipe to a branch of the feed pipe which is connected to the second separation cell.

4. The gas-separating device according to claim 1, which further comprises a recycle pipe extending from the first discharge pipe to a branch of the feed pipe which is connected to the first separation cell and a recycle pipe extending from the second discharge pipe to a branch of the feed pipe which is connected to the second separation cell.

5. A gas mixture-separating device which comprises a first separation cell provided with a first membrane; a second separation cell provided with a second membrane; a feed pipe interconnecting said first and second separation cell into a single set of separation cells for conducting a gas mixture being separated to high pressure chambers of the first and second separation cells; a first discharge pipe through which the gas portion which has permeated the first membrane is conducted from the first separation cell; a first feedback pipe for returning the gas portion which has not permeated the first membrane from the high pressure chamber of the first separation cell to the feed pipe; a second discharge pipe through which the gas portion which has permeated the membrane of the second membrane is conducted from the low pressure chamber of the second separation cell; and a second feedback pipe for returning the gas portion which has not permeated the second membrane from the high pressure chamber of the second separation cell to the feed pipe, the first membrane of the first separation cell and the second membrane of the second separation cell having opposite gas-separating tendencies.

6. A gas mixture-separating device which comprises a first separation cell provided with a first membrane; a second separation cell provided with a second membrane; a feed pipe interconnecting said first and second separation cell into a single set of separation cells for conducting a gas mixture being separated to high pressure chambers of the first and second separation cells; a first discharge pipe through which the gas portion which has not permeated the first membrane is conducted from the high pressure chamber of the first separation cell; a first feedback pipe for returning the gas portion which has permeated the first membrane from a low pressure chamber of the first separation cell to the feed pipe; a second discharge pipe through which the gas portion which has permeated the second membrane is conducted from the low pressure chamber of the second separation cell; and a second feedback pipe for returning the gas portion which has not permeated the second membrane from the high pressure chamber of the second separation cell to the feed pipe, the first membrane of the first separation cell and the second membrane of the second separation cell having the same gas-separating tendencies.

7. The gas-separating device according to claim 6, which further comprises a recycle pipe extending from the first discharge pipe to a branch of the feed pipe which is connected to the first separation cell and a recycle pipe extending from the second discharge pipe to a branch of the feed pipe which is connected to the second separation cell.

* * * * *